Aug. 10, 1937.   C. H. WALSH   2,089,456
VIBRATION SUPPRESSING TIE WIRE
Filed June 24, 1935
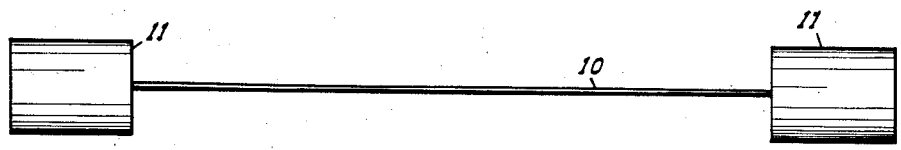
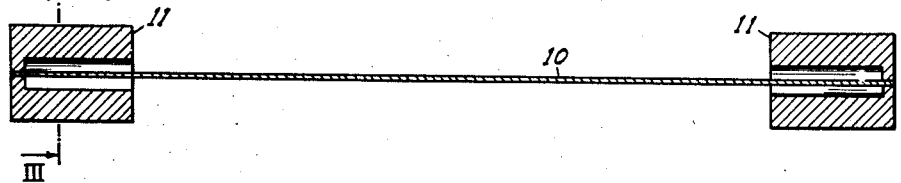
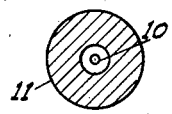
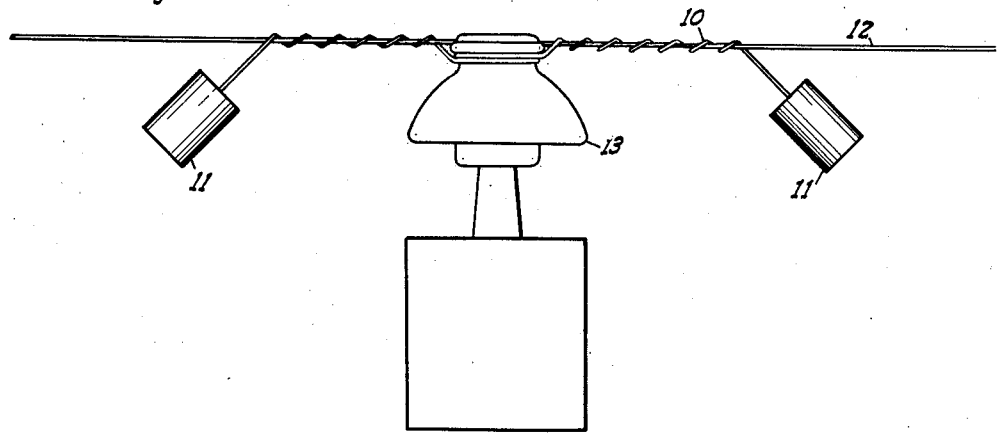
INVENTOR
Carroll H. Walsh Patented Aug. 10, 1937

2,089,456

UNITED STATES PATENT OFFICE 2,089,456

VIBRATION SUPPRESSING TIE WIRE

Carroll H. Walsh, Pine Bluff, Ark.

Application June 24, 1935, Serial No. 28,124

9 Claims. (Cl. 173—313)

This invention relates to devices for securing overhead electrical conductors to insulators or other supports, and has for its principal object the provision of a conductor securing device which will prevent vibration damage to the conductor secured.

Heretofore one device has been used to secure the conductor to the insulator, and two or more other devices associated with the conductor for the purpose of suppressing conductor vibration.

While such devices are quite effective, they are also expensive to procure and particularly to apply, because of the multiplicity of articles and operations required.

It is an object of the present invention to provide a vibration suppressing tie wire which functions to retain a conductor in place on a support and at the same time prevents the conductor from damaging vibration due to air currents, which device can be applied with the same facility and convenience as the tie wire commonly used in overhead line construction.

A further object is to provide a vibration suppressing tie wire having weights attached to the respective ends thereof, the tie wire being of a material which is soft, ductile, and substantially non-resilient for ease in tying the conductor to a support, but which in response to bending due to conductor vibration will so increase its resilience that the vibrations will be absorbed.

Another object is to provide a novel construction in a weight for a vibration suppressing tie wire whereby the over-all length of the assembly is reduced without affecting the efficiency of the device.

Another object is the provision of a simple and inexpensive device for the purposes above mentioned.

With these and other objects in view which appear from the description, my invention resides in the novel construction and combination of the parts, and in a construction in which the character of certain portions of the material in the device may be so changed in service as to accomplish the several objects.

In the drawing:

Fig. 1 is a side elevational or plan view of the device (both appearing the same); Fig. 2 is a side elevational view of the device, shown in section; Fig. 3 is a sectional view of the device as viewed from the plane 3—3; and Fig. 4 illustrates the invention in service.

Referring in detail to the drawing, a pair of weights 11, preferably of lead or other heavy metal, are provided with a cylindrical opening in each, extending coaxially from the adjacent ends thereof substantially but not entirely therethrough.

At the remote, or closed ends of the weights 11, are rigidly secured the respective ends of the soft, ductile, substantially non-resilient wire 10, the latter extending coaxially through the weights. A convenient means of attaching the weights is by serrating the wire, and subsequently pressing on the weights.

Fig. 4 illustrates the device in the service position, in which the conductor 12 is secured to the insulator 13. The best material I have thus far found for the wire 10 is copper which has been annealed at a temperature of about 750 degrees F. The resulting wire is very soft and pliable, and practically non-resilient, so that it is easily and quickly bent as required for making up a tie.

Following the completion of the tying operation, the end portions of the wire 10 are bent downwardly and outwardly for a distance depending upon the conductor size. In response to a vibratory movement of the conductor 12, due to air currents or other causes, the inertia of the weight 11 is such that a bending motion is imparted to those portions of the soft copper wire 10 between the weights 11 and the conductor 12. This bending stress quickly changes the character of that portion of the wire from its initial condition to that approaching "hard-drawn" wire, which as is well known possesses appreciable resilience and elasticity. Following this change in the character of the wire connecting the weight to the conductor, the energy of any incipient vibration is continuously absorbed, thus making impossible the building up of oscillations.

The mass of the weights 11, the position of the weights with respect to the insulator 13, and the length of the tie wire joining the weights to the conductor are all dependent upon the projected area of the conductor 12, and to a lesser degree, upon the length of the conductor span. For conductors having a projected area of No. 4 A. W. G. wire, the weights should be about 1 pound each; the position of the weights about one foot from the insulator; and the length of wire joining the weights to the conductor about 5 inches, for most effective vibration suppression on spans less than about 800 feet in length. Larger conductors require an increase in these quantities, because of their larger projected areas.

It will be seen that my construction permits the weights to be physically close to the conductor, and shortens the assembly over a construction in which the other ends of the weights are attached to the tie wire, as the effective length for vibration suppression is the total length from the conductor to the point of support on the weight.

From the above description, the simplicity and low cost of the device will be apparent in comparison to other available arrangements employing a multiplicity of parts for the same purpose.

The specific embodiment of my invention described herein may suggest equivalent constructions, and it is to be understood that my invention is to be limited only as is necessitated by the prior art and the appended claims.

What I claim is new, and desire to secure by Letters Patent, is:

1. The combination with an overhead conductor and a support therefor, of a vibration suppressing tie wire arranged to attach the conductor to the support, said tie wire comprising a soft substantially non-resilient wire secured to said conductor by wrapping therearound and having its respective ends extending divergently therefrom, and weights secured to the ends of said wire in spaced relation with said conductor, the material of said wire being such that its inherent resilience increases in response to a bending movement thereof.

2. The combination with an overhead conductor and a support therefor, of a vibration suppressing tie wire arranged to attach the conductor to the support, said tie wire comprising an easily deformable wire of low elasticity secured to the conductor by wrapping therearound and having its respective ends extending divergently therefrom, and weights secured to the ends of said wire in spaced relation to said conductor, the material of said wire having the property of increasing its resistance to deformation in response to bending thereof.

3. In combination, an overhead conductor, a support for said conductor, a tie wire securing said conductor to said support, said tie wire extending around said support and being wrapped around said conductor on either side of said support, thereby securing said conductor to said support, the end portions of said tie wire extending divergently from said conductor, and weights secured to said end portions in spaced relation to said conductor.

4. The combination with an overhead conductor and a support therefor, of a tie wire arranged to attach said conductor to said support, said tie wire being secured to said conductor and having its end portions spaced therefrom, and means including weights secured to said tie wire adjacent said end portions for suppressing the vibration of said conductor.

5. The combination with an overhead conductor and a support therefor, of an easily deformable tie wire arranged to attach said conductor to said support, said tie wire extending around said conductor and having its end portions spaced therefrom, and means including weights secured to said tie wire adjacent said end portions for increasing the resistance to deformation of said end portions in response to the vibration of said conductor.

6. The combination with a support and an overhead conductor positioned thereon, of a substantially non-resilient tie wire extending around said conductor and said support, the end portions of said tie wire being arranged in spaced relation to said conductor and said support, and weights secured to said end portions for increasing the resilience of said end portions in response to movement of said conductor.

7. In combination, an overhead conductor, a support for said conductor, a tie wire securing said conductor to said support, said tie wire being wrapped around said conductor on either side of said support and having its end portions arranged to extend divergently from said conductor, the material of said wire being such that its inherent resilience increases in response to a bending movement thereof, and weights secured to said end portions in spaced relation to said conductor.

8. In combination, an overhead conductor, a support for said conductor, a soft substantially non-resilient tie wire securing said conductor to said support, said tie wire being wrapped around said conductor on either side of said support and having its end portions arranged to extend outwardly and downwardly from said conductor, said wire having the property of increasing its resistance to deformation in response to bending thereof, and weights secured to said tie wire adjacent said end portions in spaced relation to said conductor.

9. In combination, an overhead conductor, a support for said conductor, a tie wire securing said conductor to said support, said tie wire being wrapped around said support and having weighted end portions extending outwardly and downwardly from said conductor.

CARROLL H. WALSH.